INVENTORS
PAUL E. GIES
GOTTLIEB SPERL
RALPH A. BRAATEN
ATTORNEYS

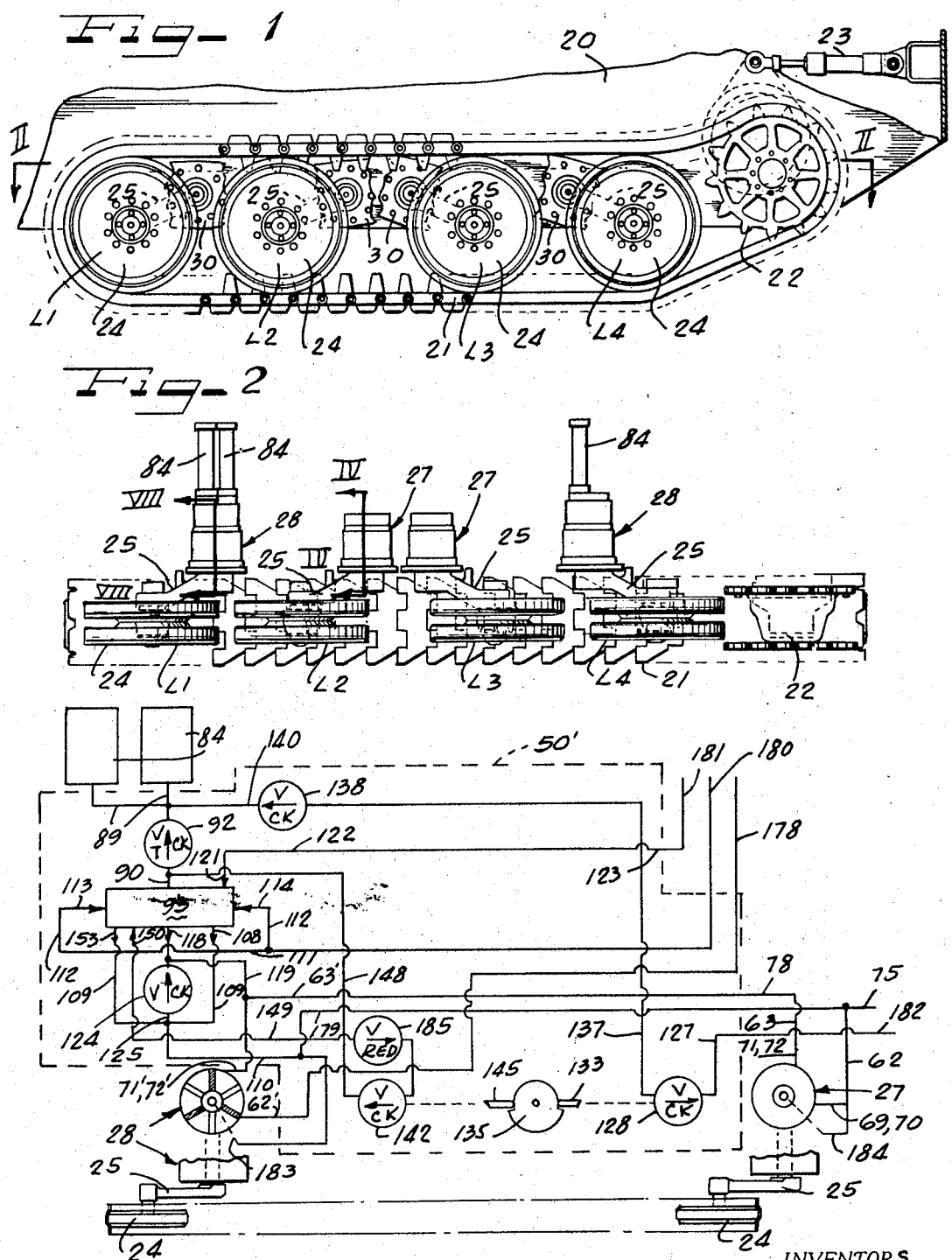

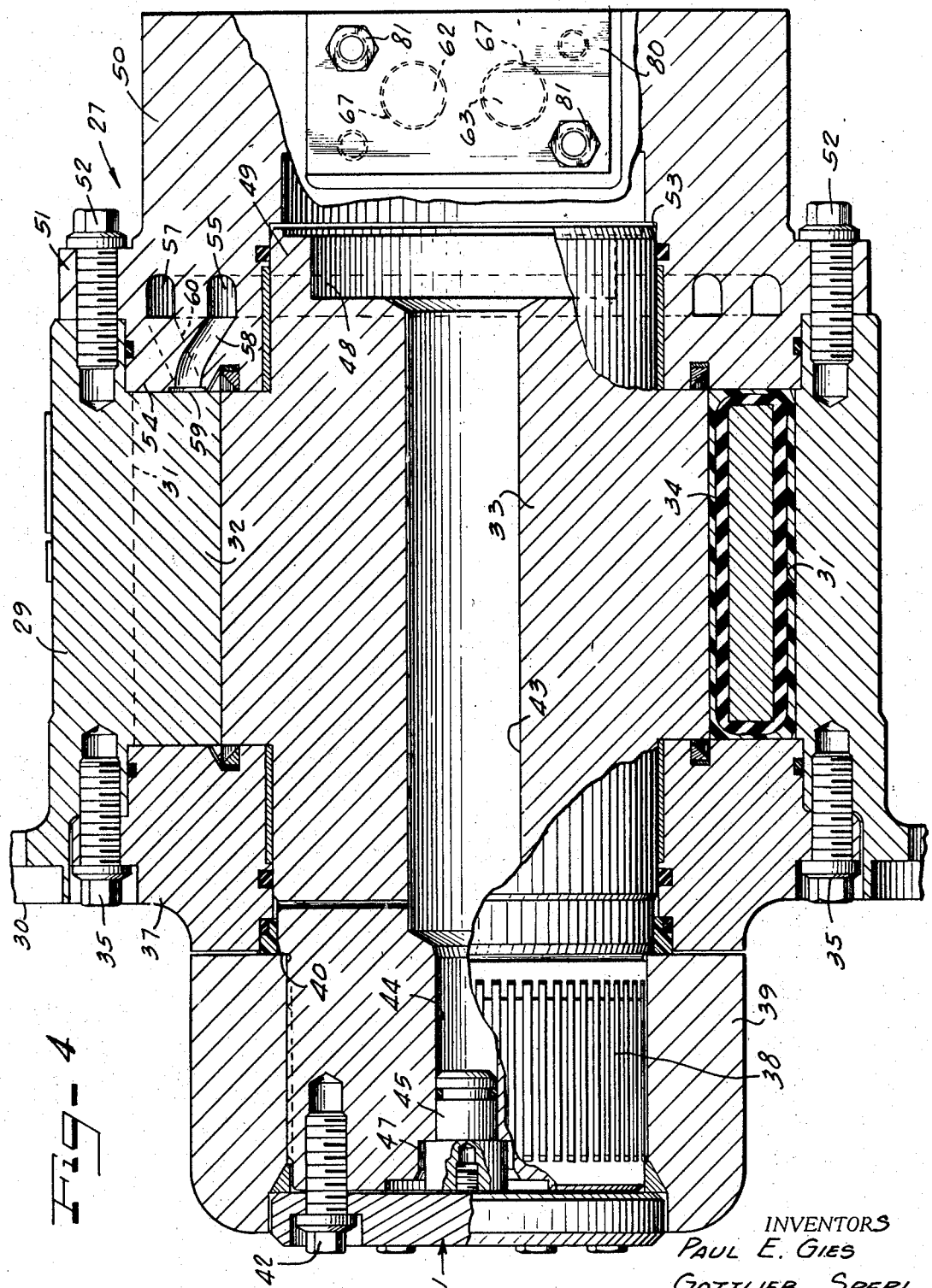

INVENTORS
PAUL E. GIES
GOTTLIEB SPERL
RALPH A. BRAATEN
ATTORNEYS

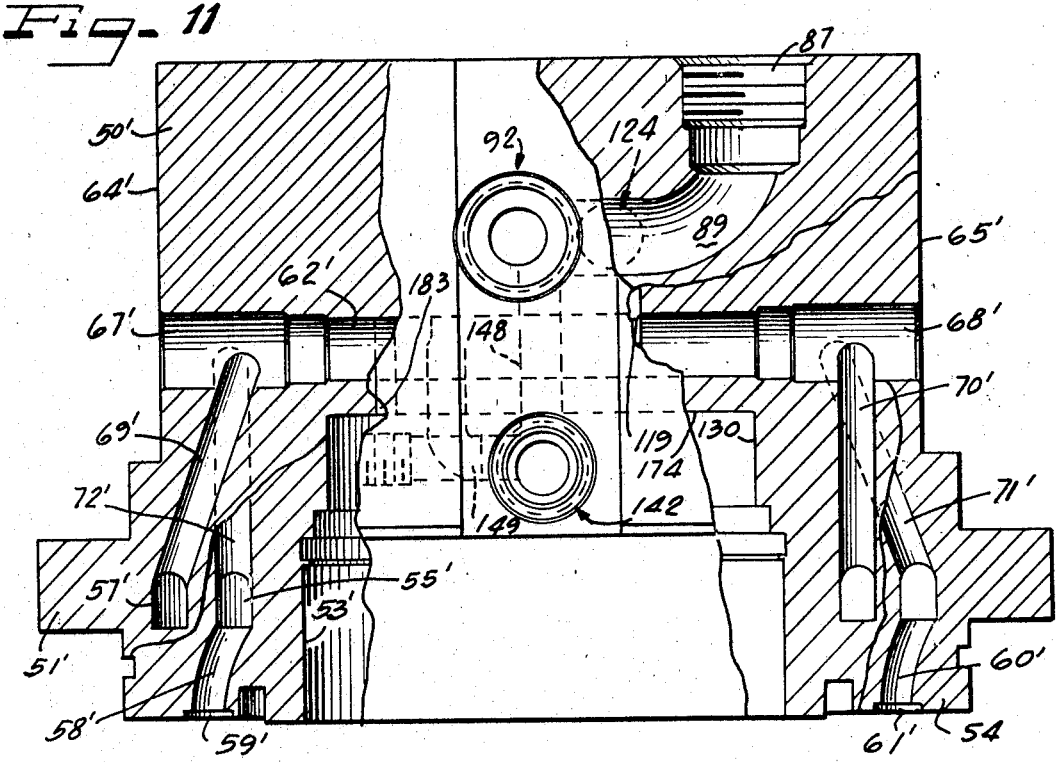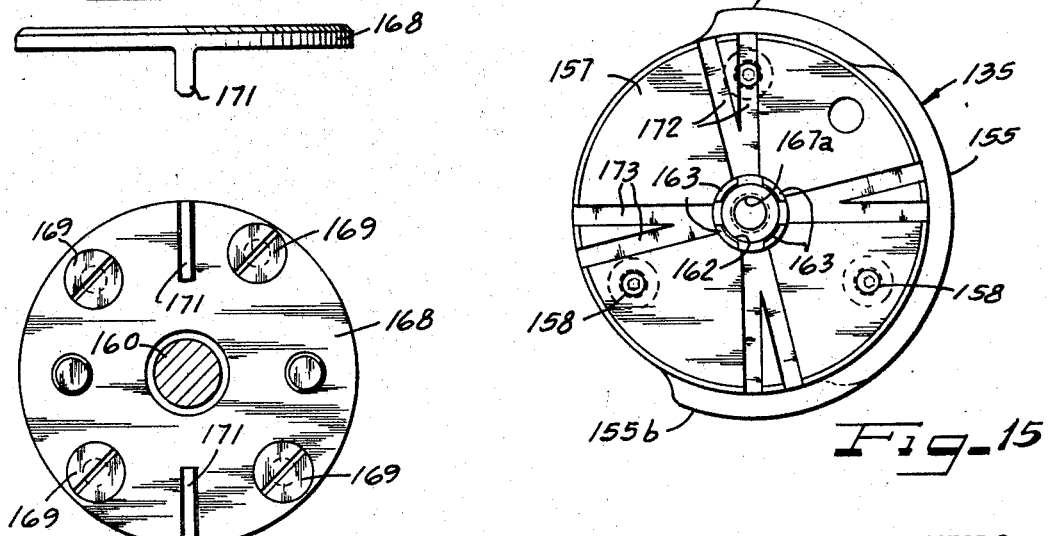

July 21, 1970 P. E. GIES ET AL 3,521,527
ROTARY VANE SUSPENSION UNITS FOR ENDLESS
TRACK VEHICLES AND THE LIKE
Original Filed March 28, 1966 7 Sheets-Sheet 7
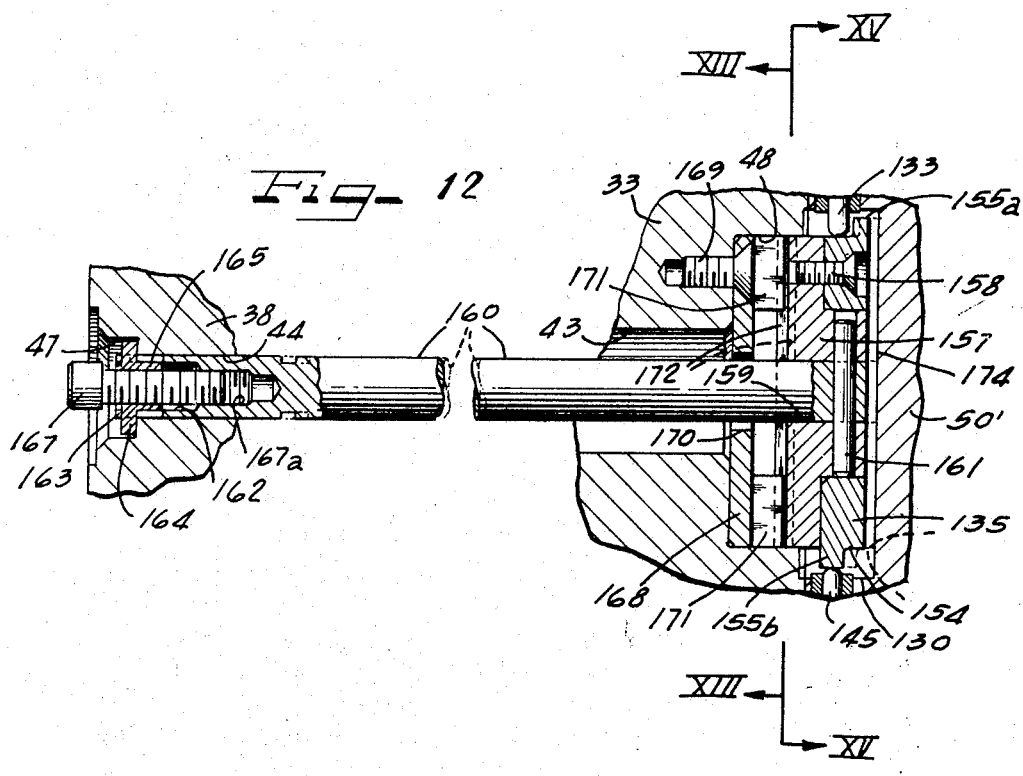
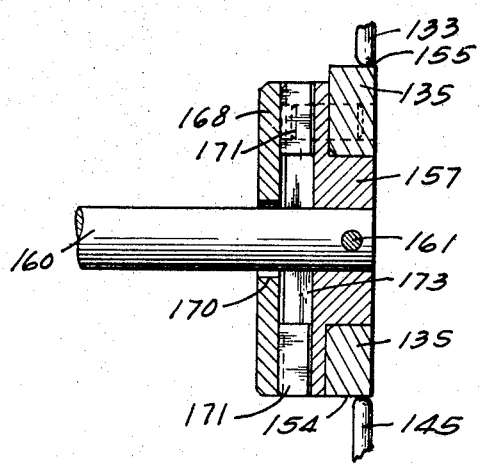
INVENTORS
PAUL E. GIES
GOTTLIEB SPERL
RALPH A. BRAATEN
ATTORNEYS

United States Patent Office 3,521,527
Patented July 21, 1970

3,521,527
ROTARY VANE SUSPENSION UNITS FOR ENDLESS TRACK VEHICLES AND THE LIKE
Paul E. Gies, Eggertsville, Gottlieb Sperl, Buffalo, and Ralph A. Braaten, Kenmore, N.Y., assignors to Houdaille Industries, Inc., Buffalo, N.Y., a corporation of Michigan
Original application Mar. 28, 1966, Ser. No. 537,916, now Patent No. 3,444,787. Divided and this application Dec. 12, 1968, Ser. No. 798,539
Int. Cl. F01b *31/12;* F15b *21/00*
U.S. Cl. 91—1                              10 Claims

ABSTRACT OF THE DISCLOSURE

A rotary vane hydraulic actuator includes a housing providing a working chamber having abutment means therein and a wing shaft mounted oscillatably in the working chamber and having vane means cooperatively related to the abutment means, with means on one end of the housing for attachment thereto of a hydro-pneumatic accumulator, hydraulic operating circuitry communicating with the working chamber and with the accumulator and including control valves having cam followers. A control cam is mounted on and oscillatable with the wing shaft and is operatively engaged by the followers, there being means in the form of a rod carried by the wing shaft and operable to adjust the cam relative to the followers.

---

The present application is a division of our copending application Ser. No. 537,916, filed Mar. 28, 1966, now Pat. No. 3,444,787.

This invention relates to improvements in rotary vane suspension units especially adapted for endless track vehicles, and more particularly concerns novel rotary actuator structures.

In the endless track running gear of certain military and utility vehicles hydro-pneumatic suspension systems are utilized comprising road wheels which run within and guide the endless track traction assembly. Each of the road wheel suspension units includes a road arm attached to the wing shaft of a rotary hydraulic actuator mounted on the frame or hull of the vehicle. Through hydro-pneumatic control circuitry, the actuators are operable to determine sprung and unsprung positions of the road wheel, and automatically equalize and level the endless track in the sprung condition of the system.

Several problems have been encountered in the actuators adapted for such running gear systems. One such problem has been that an excessively large number of components has been deemed necessary in the manifold and inner end closure for the hydraulic actuators. This has not only been costly from an original manufacturing standpoint, but has required supplying a large number of separate replacement parts for field servicing, and numerous joints liable to leakage have been present.

Another problem that has been present heretofore has been the lack of standardization in respect to the manifold structures of the actuators for the several road wheel positions. Since such a suspension system comprises both lefthand and righthand running wheel assemblies which are in a generally mirror image relationship to one another at the respective positions along the endless track, a multiplicity of different manifold arrangements have been deemed necessary, especially in respect to certain valve controlling cam structure in the actuators, thus greatly aggravating the problems of original installation as well as servicing.

Further, problems have been encountered in the control valving, and more particularly the actuator-carried main valve structure controlling the sprung and unsprung conditions of the system. Undue liability to wear and leakage, in addition to complexities in construction, has been present in the prior structures.

It is, accordingly, an important object of the present invention to provide new suspension unit structures, and more particularly rotary vane actuators, affording greater reliability, simplicity in construction easier maintenance, improved efficiency, and lower costs than prior units of the same type.

Another object of the invention is to provide a new rotary vane actuator construction for suspension units which greatly facilitates servicing.

A further object of the invention is to provide a new combination end closure and manifold structure for rotary vane actuators especially adapted for endless track vehicle suspension units.

Still another object of the invention is to provide novel control valve structure for rotary vane actuators of the kind described.

Yet another object of the invention is to provide a novel pressure responsive actuator-carried main valve construction for the end suspension actuator units of an endless track vehicle suspension system.

A still further object of the invention is to provide novel adjustment cam structure for levelling valve control in rotary actuators of the kind described, wherein a single standard cam will serve in any of the four corner road wheel unit assemblies of the suspension system of an endless track vehicle.

A yet further object of the invention is to provide novel means for adjusting the levelling valve cams for the respective corner road wheel units of an endless track vehicle suspension system.

Other objects, features and advantages of the present invention will be readily apparent from the following detailed description of certain preferred embodiments thereof taken in conjunction with the accompanying drawings, in which:

FIG. 1 is a fragmentary side elevation view, in some respects schematic, showing the left side endless track and road wheel assemblies of the running gear of a vehicle employing a hydro-pneumatic suspension system, it being understood that the opposite or right side endless track assembly of the running gear comprises a substantially mirror image of the illustrated left side assembly;

FIG. 2 is a top plan view, taken substantially along the line II—II of FIG. 1 and showing the road wheels and their associated actuators;

Figure 5:
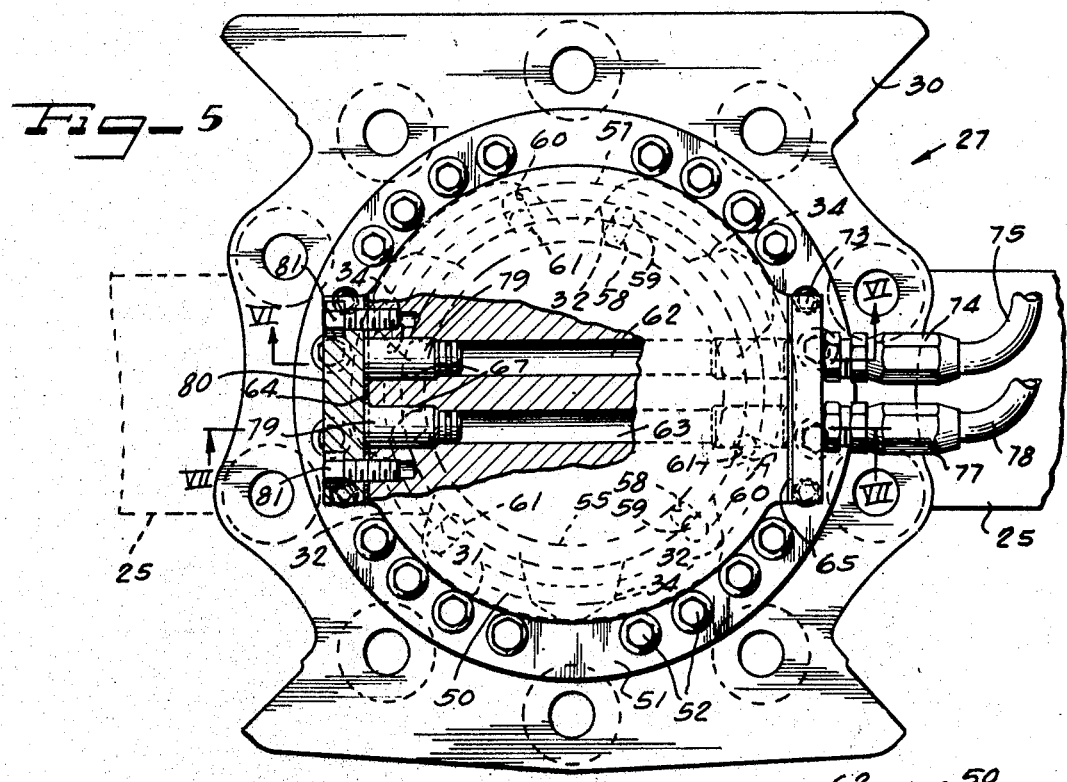
Figure 6:
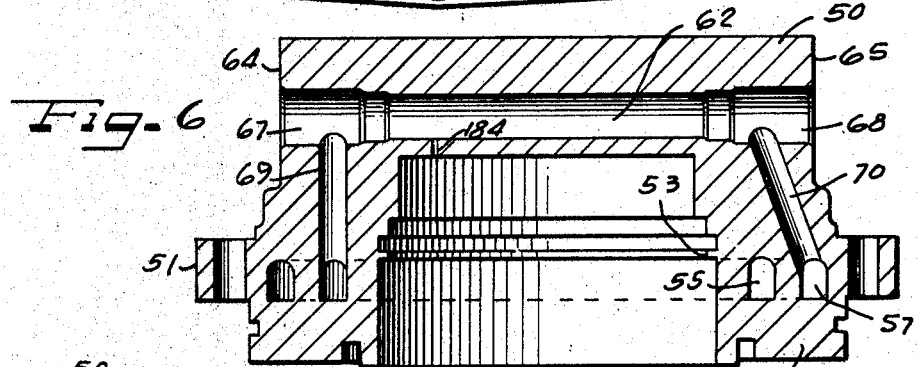
Figure 7:
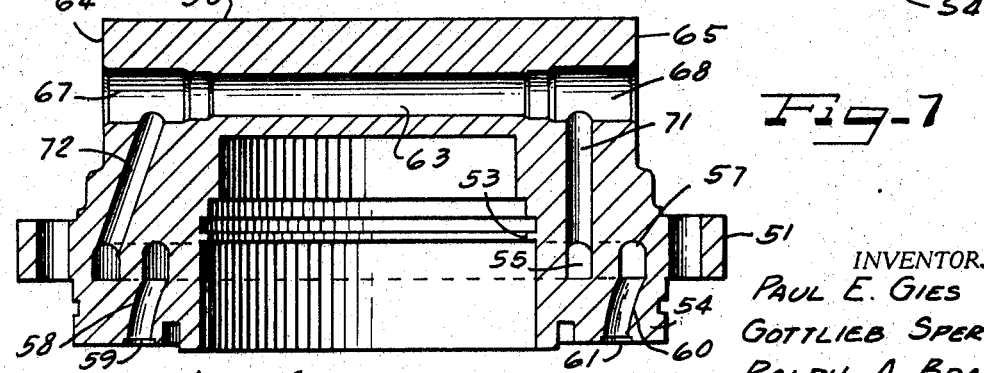
Figure 8:
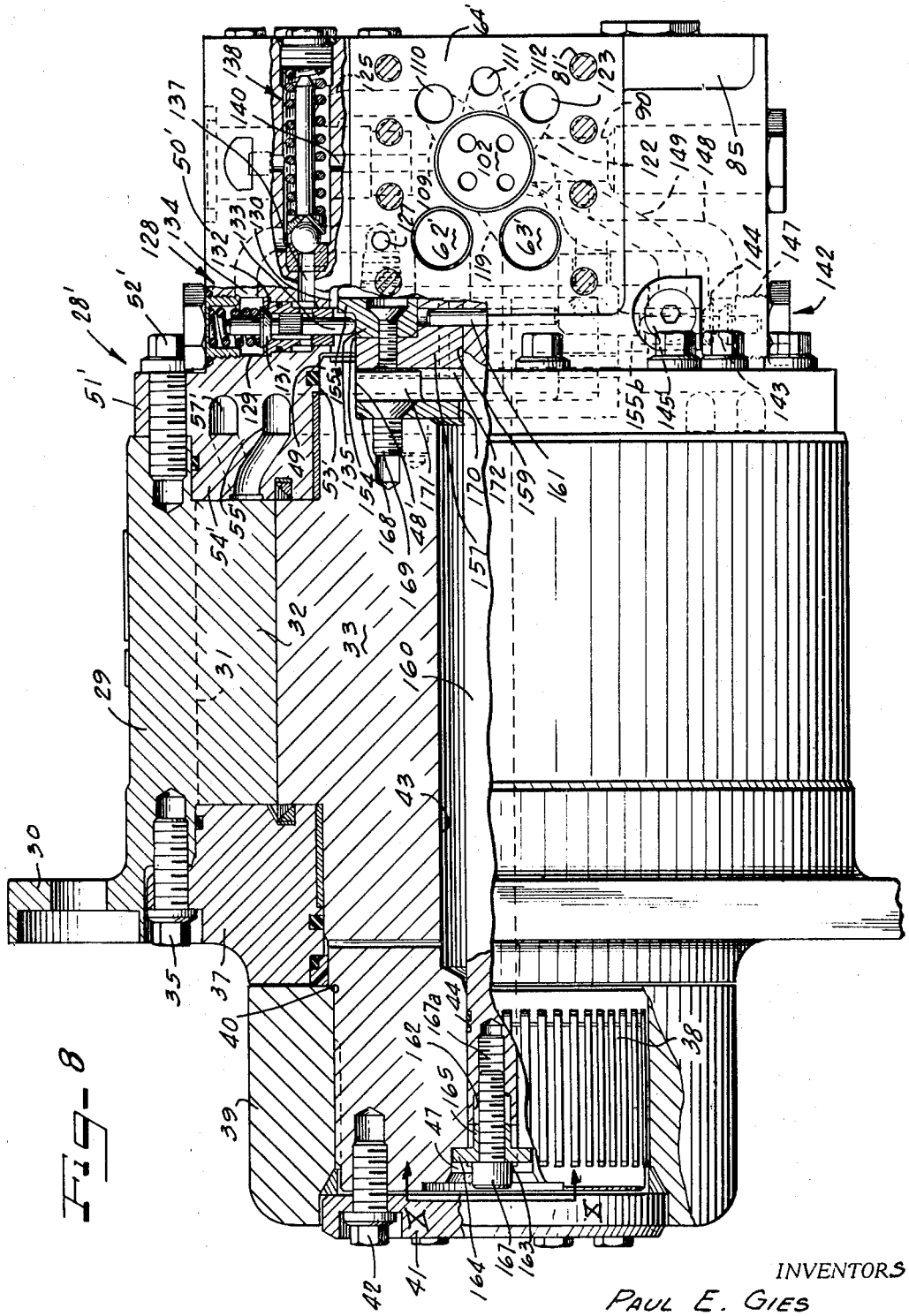
Figure 9:
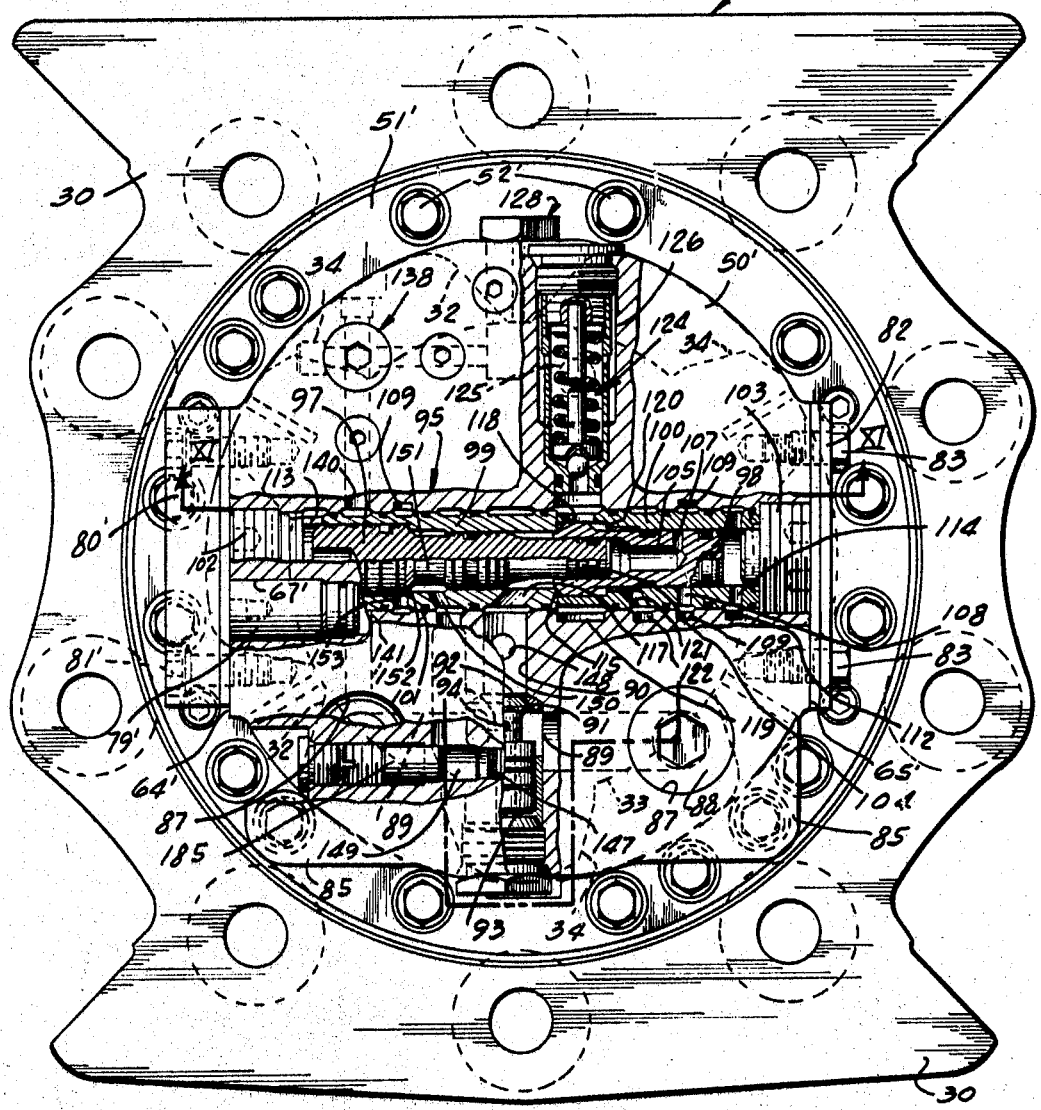
Figure 10:
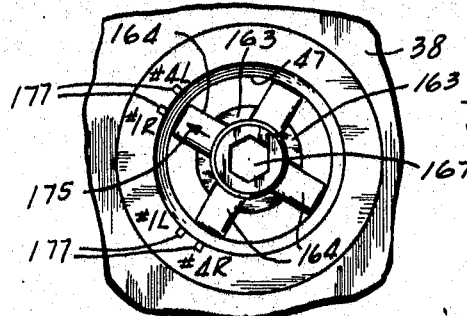

FIG. 3 is a fragmentary diagrammatic illustration of the hydro-pneumatic control system as it relates to the actuators for the front corner and the adjacent intermediate road wheels of the left side suspension, namely, in respect to the left side No. 1 and the left side No. 2 wheels, being generally illustrative of the control circuitry for all of the several road wheel actuators in the suspension system;

FIG. 4 is an enlarged fragmentary sectional and elevational detail view taken substantially on the line IV—IV of FIG. 2 and showing details of structure relating to one of the intermediate road wheel actuators;

FIG. 5 is a rear end elevational view, partly in section, of the actuator shown in FIG. 4;

FIG. 6 is a fragmentary sectional detail view taken substantially on the line VI—VI of FIG. 5;

FIG. 7 is a fragmentary sectional detail view taken substantially on the line VII—VII of FIG. 5;

FIG. 8 is an enlarged fragmentary sectional and elevational detail view taken substantially on the line VIII—VIII of FIG. 2;

FIG. 9 is a rear elevational view, partially broken away and in section of the actuator as shown in FIG. 8;

FIG. 10 is a fragmentary front end elevational view taken substantially along the line X—X of FIG. 8;

FIG. 11 is a fragmentary sectional and elevational detail view taken substantially along the line XI—XI of FIG. 9;

FIG. 12 is a fragmental sectional and elevational detail view taken in substantially the same plane as FIG. 8 but showing the levelling valve control cam and adjustment means therefor in greater detail;

FIG. 13 is a fragmentary and elevational view of the cam index plate taken substantially in the plane of line XIII—XIII of FIG. 12;

FIG. 14 is a side elevational view of the cam index plate;

FIG. 15 is a front side elevational view of the cam plate and cam assembly taken substantially in the plane of line XV—XV of FIG. 12; and FIG. 16 is a fragmentary sectional and elevational detail view of the levelling valve controlling cam assembly showing the same in a different adjusted relationship from that shown in FIG. 12.

In FIGS. 1 and 2, the left side endless track assembly of the running gear of a vehicle 20 is depicted. Such gear includes an endless tread assembly 21 driven by a toothed driving wheel 22 motivated by the power plant or engine (not shown) of the vehicle and controlled in known manner by hydraulic cylinder actuator 23 to tension the tread. Maintaining the tread 21 in road engagement is a plurality of road wheels 24, each of which is rotatably mounted on a respective road arm 25. In this instance, there are respective front and rear road wheels and two intermediate road wheels. From front to rear, the road wheels are respectively identified as L–1, L–2, L–3 and L–4. On the opposite or right side of the vehicle the same general arrangement of the running gear prevails but in substantially mirror image to that of the left side, and there the road wheels may be identified as R–1, R–2, R–3 and R–4. According to the preferred arrangement, the first two road wheels of each set have the road arm extending generally rearwardly generally right angularly to the axes of the wheels. The rear two wheels have the road arms extending generally right angularly to their axes forwardly, substantially as shown. Each of the intermediate road wheels has the distal end portion of its road arm operatively connected to a respective rotary vane actuator 27. Each of the end road wheels, and which may also be referred to as the corner wheels, has the distal end portion of its road arm operatively connected to a respective rotary vane actuator 28.

For purposes of standardization and interchangeability of parts to the extent permitted in the actuators 27 and 28, and fully enabling such differences as required for their several functions, all of the actuators are provided with the same basic envelope or housing structure and wing shaft. To this end, each of the actuators comprises a housing body 29 (FIGS. 2, 4 and 8) which is generally tubular and open at its opposite end. On its front end portion, the body 29 has a lateral attachment flange 30 (FIGS. 1, 5 and 9) by which it is fixedly, but removably attached to the frame or hull of the vehicle 20, as by means of bolts. Interiorily, the body 29 defines a generally cylindrical working chamber 31 subdivided by a plurality, herein three, radially inwardly projecting abutments 32 (FIGS. 4, 5 and 8) slidably engaged at their inner ends or tips with the generally cylindrical, complementary perimeter of a wing shaft 33 which is oscillatably mounted within the working chamber and has an equal number of radially outwardly extending vanes 34 having their tips in sliding engagement with the cylindrical wall defining the subchambers into which the working chamber 31 is equally subdivided by the abutments 32. At its outer attachment flange end, the body 29 has attached thereto as by means of bolts 35 an end closure flange disk 37 providing a bearing for the outer end journal portion of the wing shaft and which has an outward coaxial longitudinally splined road arm attachment projection terminal 38 onto which a complementary internally splined attachment eye or head 39 of the associated road arm 25 is engaged.

Retention of the road arm head 39 is against axial displacement relative to the wing shaft 33 is effected by engagement of the inner side of the head against an axially outwardly facing abutment shoulder 40 and against which the arm head is firmly clamped by means of a retaining disk 41 drawn up against the other side portion of the head by means of bolts 42 threaded into the outer end of the wing shaft terminal.

Extending axially throughout the length of the wing shaft 33 is a bore 43 adapted to serve as a seal drainage passage and which has a reduced diameter outer end portion 44 which, in the intermediate actuators 27 is closed by a sealing plug 45 seated within an outwardly opening counterbore 47 and retained in position by the retaining disk 41. At its inner or rear end, the bore 43 opens into a counterbore 48 of substantial diameter opening rearwardly within a rear end journal portion 49 of the wing shaft.

According to the present invention, a novel combination rear end cover and manifold member 50 comprising a one-piece cored casting is provided for each of the respective intermediate actuators 27. This rear cover and manifold member 50 is identical for each of the intermediate actuators and is thus readily interchangeable and provides in a single part what has heretofore been a built-up or stacked arrangement of a plurality of parts, with different parts required in respect to the manifold, at least to accommodate positioning of the actuators at the respectively opposite side suspension of the running gear. For securing the member 50 in operative, closing relation to the working chamber 31, an integral lateral flange 51 is secured as by means of bolts 52 onto the inner or rear end of the body 29. A bearing for the wing shaft journal 49 is provided by a bearing counterbore recess 53 in the inner face of the member 50. Projecting forwardly or inwardly on the member 50 about the bearing recess 53 is an annular manifold portion 54 which operatively opposes the rear ends of the abutments 32 and the rearwardly extending shoulder on the body of the wing shaft 33.

Operation of the actuator 27 is effected by distribution to the working chamber 31 of hydraulic pressure fluid into the subchambers between the abutments 32 and selectively on either side of the vanes 34 therein. To this end, the manifold portion 54 has a system of distribution passages and ports comprising a concentric inner annular main 55 and a concentric radially outer annular main 57. From the inner main 55 branch ducts 58 lead to respective ports 59 (FIGS. 4, 5 and 7) opening to the inner face of the end closure manifold adjacent to one respective side of each of the abutments 32. In like manner, branch ducts 60 lead from the outer main 57 to respective ports 61 which open through the inner face of the end closure manifold adjacent to the respective opposite sides of the abutments 32. Through this arrangement, when pressure fluid is introduced through one of the mains and drainage effected through the other of the mains, the wing shaft is driven in one rotary direction, while when the pressure and drainage relationship of the mains is reversed, the wing shaft is driven in the opposite rotary direction. When pressure is equal in both mains, the wing shaft is held in predetermined relative rotary position in the housing of the actuator.

Means are provided for connecting the mains 55 and 57 selectively and alternatively to the pressure and drain sides of the hydro-pneumatic suspension system in which the actuators 27 are integrated. Alternate selectivity of connection is desirable due to the different relative attitude or direction of projection of the road arms 25 in the running gear at each side of the vehicle. For example, while the road arm 25 of the wheel assembly L–2 extends generally forwardly, the road arm 25 of the wheel assembly L-3 extends generally rearwardly. At the right side of the vehicle the same general relationship prevails, the No. 2 wheel road arm extending generally forwardly and the No. 3 right side wheel assembly road arm extending generally rearwardly. Yet, for uniformity and simplicity in effecting installation generally the same up side and down side orientation should be provided for each actuator installation. This means, however, that for driving the road wheels into the sprung condition, the respective front and rear actuator wing shafts must be motivated in the respective opposite rotary direction in each of the left and right side sets of road wheels. Namely, when facing theretoward, the actuator for the wheel assembly L-2 must be driven counterclockwise and the actuator for the wheel assembly L-3 must be concurrently driven clockwise, and, conversely, at the right side of the vehicle the No. 2 wheel actuator must be driven clockwise and the No. 3 wheel actuator must be driven counterclockwise. To meet these requirements simply and in a substantially foolproof manner, avoiding need for anything but the installation instructions, two separate header bores 62 and 63 are provided in the body casting of the member 50 in an outwardly projecting portion thereof and with the headers spaced outwardly from the mains 55 and 57, located in spaced parallel relation, with the header 62 preferably above the operating axis of the actuator and the header 63 below the operating axis. For convenient accessibility, the headers 62 and 63 open at one of their adjacent ends through a flat side face 64 located at the left side of the casting as viewed in FIG. 5, and at their opposite ends open through a similar flat side face 65 at the right side of the unit as viewed in FIG. 5.

Consistent with the objectives of simplification and standardization, communication between the headers 62 and 63 and the mains 55 and 57 is effected in such a manner that when the appropriate hydraulic line is connected to that end of the respective header which opens in the general direction in which the road arm 25 is directed to extend from the actuator, or when the road arm is installed to extend in the general direction of those ends of the headers to which the hydraulic lines are connected, proper operation of the actuator in the system will be attained. Thus, the arrangement should be such that when the hydraulic connections are made with the headers 62 and 63 through the face 65 the proper operating relationship is provided for the actuators 27 of the No. 2 left and No. 3 right road wheels while, when the hydraulic connections are effected through the face 64, proper hydraulic operating relationship is effected for the No. 3 left and the No. 2 right road wheels. To this end, each of the headers 62 and 63 is provided in its end portion which opens through the face 64 with a similar respective counterbore 67, while in the end portions which open to the face 65 each of the headers has a counterbore 68. Connecting the drain header 62 with the main 55 is a branch duct 69 cored in the member 50 and opening into the counterbore 67. Similarly, a branch duct 70 connects the main 57 with the header 62 through the counterbore 68. Communication of the pressure header 63 with the main 55 is through a branch duct 71 which opens through the righthand counterbore 68 (FIG. 7) while communication with the main 57 is effected through a branch duct 72 opening into the counterbore 67 of this header.

Means for effecting hydraulic connection with the headers 62 and 63 through the face 65 comprise a coupling plate 73 which is suitably secured in fluid-tight relation to such face and has attached thereto suitable nipple and connector assembly means 74 by which a drain conduit 75 of the hydraulic system is coupled with the drain header 62 through the counterbore 68 thereof to effect communication through the branch passage 70 with the main 57. Similarly, a nipple and connector assembly 77 connects a hydraulic pressure conduit 78 with the counterbore 68 of the pressure header 63 for communication through the branch duct 71 with the main 55. At their opposite ends, the headers 62 and 63 are closed and communication with the mains blocked. For this purpose, a respective sealing plug 79 is fitted into each of the counterbores 67 and extends inwardly beyond the respective communicating ducts 69 and 72. Retaining the plugs 79 against blowing out is a retainer plate 80 removably secured as by means of bolts 81 to the face 64, as shown in FIGS. 4 and 5. For reverse operation of the actuator, the coupling plate 73 is transferred to the face 64 and the plug 79 and the retainer plate 80 are transferred to the opposite ends of the headers and to the face 65.

As a result of the described interchangeable and oppositely and hydraulically connectible arrangement of the combination inner end closure and manifold members 50, a minimum number of standardized parts for both original equipment and for spare parts will serve the purpose. Manufacturing costs are thus reduced to a minimum. Further, maintenance is greatly simplified by the ready interchangeability of parts between the intermediate running wheel actuator units. For field service this is a distinct advantage where, for example, a shortage of spare parts will enable making repairs by appropriating parts from disabled equipment to maintain at least some of the vehicles operational. With vehicles of the character exemplified herein any one of the plurality of intermediate rotary actuators, or any of the parts thereof can be utilized at any intermediate road wheel position interchangeably.

While the actuators 28 for the end or corner units of the running gear suspension embody the same basic construction as in the intermediate actuators 27, indicated by common reference numerals in FIGS. 4 and 8 and the associated illustrative figures, substantial addition to the combination inner end closure and manifold structure is necessary to accommodate control valving for the hydropneumatic system. According to the present invention this is accomplished in a manner to enable a single construction to function in all four corner actuators interchangeably. For this purpose a one-piece, solid cored casting 50' provides the inner end cap, the manifold, and the control valve housing. A lateral flange 51' is attached by bolts 52' to the inner end of the actuator body 29 and has a bearing recess 53' journalling the inner journal extension 49 of the wing shaft 33. Closisely related to the working chamber 31 is manifold portion 54' having therein annular mains 55' and 57' (FIGS. 8 and 11) having respective communication with the subchambers of the working chamber through branch passages 58' and ports 59' and branch passages 60' and ports 61'. Headers 62' and 63' open transversely through respectively opposite parallel faces 64' and 65', having stepped counterbores 67' at their openings through the faces 64' and identical stepped counterbores 68' through the face 65'. Communication of the header 62' with the mains is through respective branch passages 69' and 70'. Communication of the header 63' with the mains is through the branch passages 71' and 72'. On that side of the unit which is to be blocked off, respective plugs 79' are fitted into the respective counterbores (FIG. 9) and closure plate structure 80' is secured by screws 81' to the respective side face, shown as the side face 64' in FIG. 9, as is appropriate for the front right corner and the rear left corner actuators, while the reverse arrangement with the closure plate structure 80' mounted on the opposite face 65' would be effected for the left front and rear right corner actuators. In FIG. 9, by way of example, a protective cover plate structure 82 is shown secured by screws 83 to the side face 65' to protect the header and other passage entrances until the actuator is installed on the machine. Then the plate structure 82 is removed and suitable hydraulic connection coupling means such as include a coupling plate structure are applied on the order of the plate 73 described in connection with FIG. 5.

Within an enlarged outer end portion of the casing 50' are housed various control valves, and various connecting passages and headers, in addition to the headers 62' and 63' and their connecting passages are cored and drilled to afford an extremely compact, efficiently operating unit. In addition, provision is made for mounting of hydro-pneumatic air spring accumulators 84 (FIG. 2) to the outer end of the casing which for this purpose is provided with respective opposite lower abutment car extensions 85 (FIGS. 8 and 9) aligned with the outer end face within a suitable radius of a pair of threaded bores 87 into which communicating nipples on the accumulators are adapted to be secured. When not in use, any one of the accumulator communication bores 87 may be closed by a plug 88, as for example, where, as shown, the rear actuator 28 is supplied with only one of the accumulators. Cored branch passages 89 respectively extend from the accumulator bores 87 and join a passage 90 through a valve seat 91 onto which a damping valve 92 is normally biased by a spring 93 and has metering passage means 94 therethrough effecting normal communication between the branch passages 89 and the passage 90.

At its upper end, the passage 90 communicates with a pressure-responsive main control or wheel valve assembly 95 operative to determine the sprung and unsprung conditions of the associated corner actuator 28 and the nearest intermediate actuator 27 in slave relation thereto. In a highly efficient, compact form the valve assembly 95 comprises a pair of coaxial relatively reciprocable combination plunger barrel poppet members 97 and 98 slidably operative in respective distributor sleeves 99 and 100 fixedly coaxially mounted in endwise abutment within a bore 101 extending across the interior of the casing 50' between, and opening through, the faces 64' and 65'. This bore is closed in assembly by respective threaded plugs 102 and 103 which thrust against the outer ends of the sleeves 99 and 100, respectively, and maintain their inner ends in abutment. While the slidable valve member 97 is solid and provides suitable annular external grooves and intervening annular lands, the slidable valve member 98 is hollow and at its inner end opens toward and slidably receives a terminal plunger projection 104 of the valve member 97. This defines a pressure relief and leakage drainoff chamber 105 within the valve member 98 which is in drainage communication through a port 107 therefrom and a port 108 through the sleeve 100 with a connecting branch passage 109 (FIGS. 8 and 9) connecting with a drain header 110 comprising a bore transversely through the casing 50'.

In the unsprung operation of the suspension system, the valve members 97 and 98 are biased toward one another and block the passage 90. For this purpose, hydraulic pressure is introduced through a header 111 (FIG. 8) comprising a transverse bore through the castings 50' parallel to the valve bore 101. Branch connecting passages 112 from the opposite end portions of the header 111 introduce the pressure into the respective outer end portions of the valve guide sleeves 99 and 100 through respective ports 113 and 114 to impress the pressure on the respective outer ends of the valve members 97 and 98. Thereupon the wheel valve members assume the relative positions shown in FIG. 9, wherein the inner poppet end of the valve member 98 closingly engages an annular seat 115 provided by the inner end of the sleeve 99 to block communication of the passage 90 through a port 117 in the sleeve 99 and a port 118 in the sleeve 100 with a connecting branch passage 119 leading to the pressure header 63'. At the same time, communication is opened with the pressure header 63' past a valve seat 120 on the sleeve 100 and a port 121 through the sleeve with a connetcing branch passage 122 leading from a hydraulic pressure header 123 comprising a transverse bore extending through the casting 50' parallel to the valve bore 101. This direct pressurizing of the actuator through the header 63', bypassing the air spring accumulators 84, is a maneuver useful in raising the vehicle on the road wheels. After being raised, the vehicle may run sprung or unsprung, as controlled in the driver's compartment.

In both the unsprung and sprung conditions of the system, communication is maintained through the valve sleeve port 118 with a shock load, spring biased relief valve assembly 124 having communication with the drainage header 110 through a connecting branch passage 125. As shown in FIG. 9, the relief valve assembly 124 is conveniently mounted in a stepped bore 126 in the casing 50' normal to and communicating at its inner end with the valve bore 101 in alignment with the port 118 or at least the annular groove about the inner end portion of the valve sleeve 100 through which such port opens.

To move the wheel valve members 97 and 98 into the sprung mode of operation of the suspension system, the header 111 is depressurized to remove the unsprung bias from the wheel valve assembly 95 and a sprung condition bias is applied to the wheel valve through the accumulator connecting passage 90 which causes the valve members 97 and 98 to move apart by action of pressure fluid on opposing pressure sensitive surfaces on the inner terminal portions of the valve members. As the valve member 98 shifts toward the plug 103, passage past the valve seat 115 is opened to connect the port 118 and thence through the passage 119 with the pressure header 63'. At the same time the poppet head of the valve member 98 closes against the valve seat 120 to disconnect the port 118 from the header 123.

Hydraulic pressure for the sprung condition of the suspension system is supplied through a header 127 comprising a bore extending transversely through the casting 50' between the faces 64' and 65' and located in spaced parallel relation above the low pressure or drain header 62'. Control of pressure fluid from the header 127 in a hydraulic circuit to the accumulators 84 is by means of a fill levelling valve assembly 128 mounted within a bore 129 which extends from the top of the casting 50' adjacent to the attachment flange 51' downwardly into an extension cavity chamber 130 of the bearing recess 53' in the closure manifold portion 54'. In a desirable form the valve assembly includes a spring biased poppet 131 normally closed against a seat 132 and with an actuating and guide stem 133 extending downwardly radially into the chamber 130. Communication of the pressure header 127 is through a connecting passage 134 opening into the valve bore 129 above the seat 132. Until the vehicle has been raised to sprung position, the valve 131 is held open.

As the wing shaft 33 turns during raising of the vehicle toward sprung position, a cam 135 within the chamber 130 rotates with the wing shaft and actutes the poppet valve stem 133 to open the valve 131. Thereupon, hydraulic pressure supplied by the header 127 passes the valve seat 132 and travels through a port 137 through a check valve assembly 138 mounted in a bore 139 in the casting 50' (FIG. 8). From the check valve bore 139, hydraulic pressure moves through a passage 140 into the wheel valve bore 101, bypasses the valve sleeve 99 (FIG. 9), and by a continuation 141 of the bypass passage connects in pressure delivery communication with the nearest branch duct 89 communicating with the accumulators.

Cooperatively related to the fill levelling valve assembly 128 is a dump levelling valve assembly 142 which in all material respects is the same in construction and operation as the fill levelling valve and is mounted in the casting 50' diametrically opposite to the fill levelling valve. A poppet 143 of the dump levelling valve 142 is spring biased normally into a downwardly facing seat 144 and has a control stem 145 projecting into the chamber 130 (FIG. 12) to be operated by the cam 135. Below the seat 144 drainage is effected into a valve bore 147 by way of a passage 148 which leads from the passage 90. Thereby when the valve 143 is open, drainage will occur through a passage 149 leading from the valve bore 147 (FIG. 9) and communicating through a port 150 and the valve sleeve 99 with an annular control groove 151 on the perimeter of the valve member 97. In the unsprung bias of the wheel valve, a poppet head on the valve member 97 closes against a seat 152 provided by the sleeve 99, thereby blocking communication with a port 153 through the sleeve and through a second drainage passage branch 109 connecting with the drainage header 110. When the wheel valve 95 is biased into the sprung relationship, the valve member 97 unseats relative to the valve seat 152 and the dumping circuit is opened under the control of the valve assembly 142.

During running of the vehicle in the sprung mode of the suspension, the cam 135 operates automatically upon the fill levelling valve 128 and the dump levelling valve 142 as the associated running wheel descend or rise, respectively, relative to the mean level of the running wheels with the endless track on a level surface, thereby providing make-up hydraulic fluid supply to the accumulators 84 through the valve 128 or alternatively bleeding or dumping hydraulic fluid from the accumulators through the valve 142 and maintaining a substantially balanced suspension spring responsiveness in and through the accumulators in all positions of the running wheels relative to the predetermined level position. For this purpose, the cam 135 comprises a disk having a semi-cylindrical perimeter 154 over more than 180° of its circumference so that within a normal range of level springing movement the diametrically opposed valve stem followers 133 and 145 will ride such cylindrical surface. Throughout the remainder of its circumference, the cam has a semi-cylindrical valve-opening lobe 155 (FIGS. 15 and 16) having smooth transition lead in surfaces joining the perimeter surface 154.

In order to accommodate all four positions of the actuators 28 with one standard working unit, the cam 135 is efficiently constructed to serve as four cams readily adjustable according to predetermined coded instructions to accommodate each of the four corner actuator requirements resulting from the respective directional attitudes of the road arms 25 and the mounted positions of the respective actuators. To this end, the width of the cam surfaces 154 and 155 is about twice the width required for riding engagement by the poppet valve follower stems 133 and 145. On one end, the cam lobe 155 has a suitable lobe extension 155a (FIGS. 12 and 15) of sufficiently less width than the lobe 155 to clear the follower 133 to ride a continuation of the surface 154 in adjustments of the cam to accommodate the front right and lefthand rear corner road wheel actuator positions. Similarly, the cam lobe 155 has an opposite end extension 155b which is of sufficiently narrower width than the main lobe and on the opposite side of the cam from the extension 155a so as to clear the valve stem follower 145 to ride a continuation of the surface 154 in adjustments of the cam to accommodate the front left and rear right corner road wheel actuator positions.

To enable ready adjustment of the cam 135 for interchangeable use of the associated actuator 28, without dismantling the actuator and more particularly the inner end closure and manifold unit 50' or the wing shaft 33 to gain access to the cam for such adjustment, adjustment manipulating means are provided which are operable from the outer end of the wing shaft. To this end, the cam member 135 is desirably constructed as a hardened ring concentrically mounted on a carrier disk 157 and secured thereto as by means of screws 158. Coaxially mounted in a bore 159 through the carrier disk 157 is an adjustment or indexing rod 160 secured corotatively with the carrier as by means of a coupling pin 161. From the carrier 159 the rod 160 extends outwardly through the wing shaft bore 43 and is slidably journalled in the reduced diameter bore 44 in the journal portion 38. In its outer extremity, the rod 160 is provided with a counterbore 162 and is slotted in normal diametral planes to provide spaced terminal sectors 163 (FIGS. 8, 10 and 12), between which are engaged complementary index flange arms 164 on a cylindrical flange body 165 fitting in slidable centered relation within the counterbore extension surfaces of the sectors. Adjusted position of the index rod 160 is maintained by a bolt 167 extending through the sleeve 165 and threaded into a counterbore extension 167a, with the head of the bolt thrusting the index flange arms 164 against the outwardly facing surface defining the inner end of the counterbore 47.

Any selected indexed position of the cam 135 is maintained by an index plate 168 (FIGS. 8, 12, 13 and 14) which is secured to the bottom of the counterbore 48 as by means of screws 169. An axial clearance aperture 170 passes the indexing rod 160 through the index plate. Indexed coupling of the cam with the index plate 168 is effected by means of a pair of diametrically opposite and aligned fin-like index lugs 171 projecting toward the cam carrier disk 157. Selectively receptive of the index lugs 171 are respective indexing grooves in the face of the cam carrier which opposes the indexing plate 168 and comprises a pair of shallow grooves 172 (FIG. 15) disposed in narrow-X diametrical crossing relation and within which the indexing lugs are engageable for effecting adjustments of the cam wherein the lobe extension 155a clears the follower 133 (FIG. 12) and the lobe 155b is aligned with the follower 145. A second set of diametrical grooves 173 in narrow-X crossing relation is located in the index plate-opposing face of the carrier disk 157 normal to the longitudinal axes of the grooves 172 and of sufficiently greater depth than the grooves 172 to receive the indexing lugs 171 for effecting adjustment of the cam 135 to clear the lobe 155b relative to the follower 145 and to align the lobe 155a for engagement with the follower 133 in operation (FIG. 16).

Indexed adjustments of the cam 135 are readily effected through the indexing rod 160 by backing the cam assembly away from the index plate 168 to disengage the index lugs 171 from the indexing grooves 172 and 173, as indicated in dash outline in FIG. 12. During this indexing maneuver, the screw 167 is backed off, as shown, and inward pressure thereon used to push the rod 160 inwardly until the cam or the cam carrier plate 157 abuts an opposing stop or gaging surface 174 provided by the bottom of the cavity 130. With the cam carrier thus cleared from the indexing lugs 171, the indexing rod 160 can readily be turned into properly adjusted position as by utilizing the arms 164 of the index flange as an adjusting wheel.

Visual indexing is enabled by providing suitable indexing indicia on the index flange and more particularly one of the arms 164, such as an arrow 175 (FIG. 10) and marks 177 on the adjacent outwardly facing end surface of the wing shaft journal portion 38 corresponding to the properly indexed positions of the cam for each respective installation. In addition, identification of the index marks 177 is desirable, as shown. For example, #1R and #4L identify the index positions for the front right and rear left actuators, for which adjustment is effected through the shallow grooves 172. #1L and 4R refer to respectively the front left and rear right actuators for which adjustment is effected through the deeper grooves 173. When the arrow 175 has been aligned with the selected index mark 177, tightening of the screw 167 against the index flange draws up the indexing rod 160 and effects coupling interlock of the indexing lugs 171 with the cam carrier 157.

During the cam indexing maneuver, the protective closure plate 41 is, of course, removed, or such indexing adjustment is effected before such plate is applied. After the cam has been properly indexed for the selected corner position of the actuator, the plate 41 is secured in place. This not only protects the outer end of the wing shaft journal 38 and the indexing flange from damage or accumulation of dirt thereon, but also provides a safety abutment stop opposing the head of the screw 167 to prevent unintentional backing off of the screw as might be caused by vibration. Thus, the plate 41 serves as a positive cam adjustment retainer in cooperation with the screw 167.

On reference to the hydro-pneumatic circuit diagram of FIG. 3, taken together with the description in respect to FIGS. 4–7 as to the selected intermediate actuator 27 and FIGS. 8, 9 and 11 in respect to the selected end or corner actuator 28, a thorough understanding of the operating coordination of the actuators is afforded. It will be observed that a slave relationship of the adjacent intermediate actuator 27 to the illustrated end actuator 28 is afforded by connection of the pressure duct 78 of FIG. 5 with the header 63' of FIGS. 8 and 11. In the form of FIG. 8 a duct 178 (FIG. 3) is suitably connected in communication with the header 62' for drainage when raising to the sprung mode of operation or pressure to lower the suspension. Other suitable operating duct connections are provided for the other headers including a drain duct 179 connection with the header 110 and with the duct 75. A pressure conduit 180 connects with the header 111. A pressure conduit 181 connects with the header 123. A pressure conduit 182 connects with the header 127. A leakage drain passage 183 (FIGS. 3 and 11) connects to the header 110 and the drain line 179. A similar drainage passage 184 (FIGS. 3 and 6) is provided for the actuator 27. An adjustable reducing valve 185 (FIGS. 9 and 3) may be provided in the passage 149 which leads from the dumping valve 142 to the wheel valve 95.

In the entire vehicle suspension system each of the end or corner actuators 28 has the immediately adjacent intermediate actuator 27 in slave relation thereto similarly as depicted in FIG. 3. All of the pressure and drainage and combination pressure drainage conduits operatively connected to the actuators are under the control of the operator of the vehicle through master controls, as is known practice.

It will be understood that modifications and variations may be effected without departing from the scope of the novel concepts of the present invention.

We claim as our invention:

1. In a rotary vane hydraulic actuator of the character described including a housing providing a working chamber having abutment means therein and a wing shaft mounted oscillatably in said working chamber and having vane means cooperatively related to said abutment means:
    means on one end of the housing for attachment thereto of a hydro-pneumatic accumulator and including an accumulator communication passage;
    means providing hydraulic operating circuitry communicating with said working chamber and with the accumulator communication passage;
    control valves having cam followers and operative to control hydraulic fluid displacement between said passage and said operating circuitry;
    a control cam mounted on and oscillatable with said wing shaft and operatively engaged by said followers; and means carried by said wing shaft and operable to adjust said cam relative to said followers.

2. An actuator as defined in claim 1, in which said cam adjusting means comprises an adjusting rod extending through said wing shaft and having means thereon remote from said cam for turning the rod to turn the cam adjustably.

3. An actuator as defined in claim 2, in which said wing shaft and said cam have releasable corotational interlocking means releasable and engageable by manipulation of said rod, and said rod has means thereon cooperative with the wing shaft for securing the interlocking means in locking relation.

4. An actuator as defined in claim 3, including means detachably mounted on the wing shaft and cooperating to maintain said securing means against unintentional release.

5. An actuator as defined in claim 2, including visual indexing means on the wing shaft and on the rod for effecting predetermined indexed adjustments of the cam.

6. An actuator according to claim 1, said cam comprising a disk structure having a semi-cylindrical perimeter and a semi-cylindrical valve-actuating lobe with smooth transition lead-in surfaces joining the semi-cylindrical perimeter, and said valves comprising poppets having stems with ends thereon providing said cam followers and engaging said perimeter and said lobe in the oscillations of the cam with the shaft.

7. An actuator according to claim 6, said surface and said lobe being of substantial width, said lobe having respective opposite end extensions narrower than said lobe and relatively off-set to opposite sides of the surface, and said cam being adjustably axially to select the lobe extension to be operative in respect to said cam followers.

8. An actuator according to claim 7, said cam being adjustable rotationally as well as axially by said adjusting means.

9. An actuator according to claim 6, said means operable to adjust the cam relative to the followers being adapted to adjust said cam both axially relative to the wing shaft and also rotationally relative to the wing shaft.

10. An actuator according to claim 6, said cam disk structure having a face provided with generally radially extending adjustment grooves therein, and said wing shaft having means thereon providing complementary lugs selectively engageable in said grooves through the operation of said means operable to adjust the cam relative to the followers.

References Cited

UNITED STATES PATENTS

| 851,195 | 4/1907 | Bauer et al. | 60—51 |
| 1,063,141 | 5/1913 | Spohrer | 91—410 X |
| 1,781,563 | 11/1930 | Walter | 91—410 X |
| 2,159,142 | 5/1939 | Fischer | 91—382 X |
| 2,456,690 | 12/1948 | Eastman | 91—382 X |
| 3,069,855 | 12/1962 | Denkowski et al. | |
| 3,174,405 | 3/1965 | Wilkinson | 91—1 |
| 3,262,522 | 7/1966 | Johnson et al. | 280—43.23 X |

FOREIGN PATENTS 200,197    7/1923    Great Britain.

MARTIN P. SCHWADRON, Primary Examiner

I. C. COHEN, Assistant Examiner

U.S. Cl. X.R.
60—51; 91—5, 382

UNITED STATES PATENT OFFICE
CERTIFICATE OF CORRECTION

Patent No. 3,521,527  Dated July 21, 1970

Inventor(s) Paul E. Gies, Gottlieb Sperl and Ralph A. Braaten

It is certified that error appears in the above-identified patent and that said Letters Patent are hereby corrected as shown below:

Column 3, line 61, for "interiorily" read "interiorly"; Column 4, line 5, omit "is", line 33, for "suspension" read "suspensions"; Column 6, line 55, for "faces" read "face"; Column 7, line 3, for "casing" read "casting", line 11, for "car" read "ear", line 20, before "bores" insert "connection", line 72, for "connetcing" read "connecting"; Column 12, line 29, for "adjustably" read "adjustable".

SIGNED AND
SEALED
NOV 10 1970

(SEAL)
Attest:

Edward M. Fletcher, Jr.
Attesting Officer

WILLIAM E. SCHUYLER, JR.
Commissioner of Patents

FORM PO-1050 (10-69)